United States Patent
Chang et al.

(10) Patent No.: US 12,206,932 B2
(45) Date of Patent: Jan. 21, 2025

(54) UNIVERSAL LIVE STREAMING WITH INTERACTION

(71) Applicant: 17LIVE JAPAN INC., Tokyo (JP)

(72) Inventors: YuChuan Chang, Taipei (TW); ChiaHan Chang, Taipei (TW); YuChun Chen, Taipei (TW)

(73) Assignee: 17LIVE JAPAN INC., Tokyo (JP)

( * ) Notice: Subject to any disclaimer, the term of this patent is extended or adjusted under 35 U.S.C. 154(b) by 0 days.

(21) Appl. No.: 17/781,837

(22) PCT Filed: Mar. 10, 2021

(86) PCT No.: PCT/JP2021/009628
§ 371 (c)(1),
(2) Date: Jun. 2, 2022

(87) PCT Pub. No.: WO2022/190291
PCT Pub. Date: Sep. 15, 2022

(65) Prior Publication Data
US 2024/0098331 A1 Mar. 21, 2024

(51) Int. Cl.
*H04N 21/438* (2011.01)
*H04N 21/2187* (2011.01)
*H04N 21/478* (2011.01)

(52) U.S. Cl.
CPC ..... *H04N 21/4384* (2013.01); *H04N 21/2187* (2013.01); *H04N 21/4781* (2013.01)

(58) Field of Classification Search
CPC .......... H04N 21/4384; H04N 21/2187; H04N 21/4781; H04N 21/4312; H04N 21/472; H04N 21/8153; H04N 21/8545
See application file for complete search history.

(56) References Cited

U.S. PATENT DOCUMENTS 10,200,654 B2   2/2019 Szymczyk et al.
11,178,450 B2 * 11/2021 Zhang .................... A63F 13/86
(Continued)

FOREIGN PATENT DOCUMENTS

JP   2016-513826 A   5/2016
JP   2020017243      1/2020
(Continued)

OTHER PUBLICATIONS

International Search Report and Written Opinion issued in PCT/JP2021/009628, dated Jun. 15, 2021.
(Continued)

*Primary Examiner* — Alazar Tilahun
(74) *Attorney, Agent, or Firm* — Chun-Ming Shih; HDLS IPR SERVICES

(57) ABSTRACT

An exemplary method including: receiving downstream data including a first video stream and first content information, the first video stream being transmitted from a first device, the first content information describing a graphical object; receiving first interaction information indicating a first user interaction feedback to the graphical object at the first device, generating a first content texture including the graphical object, an appearance of the graphical object being determined using the first content information and the first user interaction feedback included in the first interaction information; generating a video frame including the first content texture and a second content texture, the second content texture being generated from the first video stream; displaying the video frame at the first device and a second device; receiving a second user interaction feedback to the video frame at the second device; and transmitting second interaction information indicating the user interaction feedback.

20 Claims, 12 Drawing Sheets

(56) References Cited

U.S. PATENT DOCUMENTS

| | | |
|---|---|---|
| 2008/0133640 A1 | 6/2008 | Saito et al. |
| 2009/0271820 A1 | 10/2009 | Zalewski |
| 2009/0271821 A1 | 10/2009 | Zalewski |
| 2012/0093486 A1 | 4/2012 | Tsurumi |
| 2018/0221762 A1 | 8/2018 | Noguchi et al. |
| 2020/0099960 A1* | 3/2020 | Yu .......................... A63F 13/86 |
| 2020/0413145 A1* | 12/2020 | Fukuda .............. H04N 21/4781 |
| 2022/0053227 A1* | 2/2022 | Kurabuchi ........... G06Q 10/101 |

FOREIGN PATENT DOCUMENTS

| | | |
|---|---|---|
| JP | 2020-163043 A | 10/2020 |
| JP | 2020163043 | 10/2020 |
| WO | 2004075547 | 2/2004 |
| WO | 2004/075547 A1 | 9/2004 |
| WO | 2014136920 | 9/2014 |

OTHER PUBLICATIONS

Notice of Reasons for Refusal dated Apr. 4, 2023, issued in corresponding Japanese Patent Application JP 2022-505629 with English translation (30 pgs.).

* cited by examiner

Fv[A, t4]

T[B, 1, t4]

Fv[B, t5]

UNIVERSAL LIVE STREAMING WITH INTERACTION

CROSS-REFERENCE TO RELATED APPLICATIONS

This application is the U.S. National Phase Application of PCT/JP2021/009628, filed on Mar. 10, 2021, the contents of which are incorporated herein by reference in entirety.

TECHNICAL FIELD

The present invention relates to an interaction on live streaming.

BACKGROUND ART

Various technologies for enabling users to participate in mutual on-line communication are known. For example, PTL1 discloses a technique enabling two user terminals to share a pointer on a screen. PTL 2 discloses a technique of compositing a content on video game screens of multiple devices. PTL 3 discloses a technique of sharing a content screen and an operational input to control the content screen, across multiple devices. PTL 4 discloses a technique of interaction between a content and users. PTL 5 discloses a technique of sharing an AR content with multiple devices.

CITATION LIST

Patent Literature

PTL 1: US 2008/0133640A1
PTL 2: US 2018/0221762A1
PTL 3: US 2012/0093486A1
PTL 4: US 2009/0271821A1
PTL 5: U.S. Pat. No. 10,200,654B2

SUMMARY OF INVENTION

Technical Problem

As live streaming increases in popularity, user demand for improved interactive experience in live streaming is rising.

The present disclosure provides a technique for synchronization between live streaming and user interaction.

Solution to Problem

According to one aspect of the disclosure, there is provided a method including: receiving downstream data including a first video stream and first content information, the first video stream being transmitted from a first device and the first content information describing a graphical object; receiving first interaction information indicating a first user interaction feedback to the graphical object at the first device, generating a first content texture including the graphical object, an appearance of the graphical object being determined using the first content information and the first user interaction feedback included in the first interaction information; generating a video frame including the first content texture and a second content texture, the second content texture being generated from the first video stream; displaying the video frame at the first device and a second device; receiving a second user interaction feedback to the video frame at the second device; and transmitting second interaction information indicating the user interaction feedback.

The method may further include transmitting upstream data including at least second content information describing the appearance of the graphical object.

The upstream data may further include a second video stream generated at the second device.

The video frame may be generated by overlaying the graphical object on the first content texture.

The first interaction information may further indicate a third user interaction feedback to the graphical object at a third device.

The downstream data may be received from a first server.
The upstream data may be transmitted to the first server.
The first interaction information may be received from a second server.
The second interaction information may be transmitted to the second server.

The first user interaction feedback may include at least one of clicking, tapping, and dragging the graphical object.

The graphical object may show a character in a video game.

According to another aspect of the disclosure, there is provided an information processing device including: a control layer; a renderer; and a display layer, wherein the renderer is configured to receive downstream data including a first video stream and first content information, the first video stream being transmitted from another device, the first content information describing a graphical object, the control layer is configured to receive first interaction information indicating a first user interaction feedback to the graphical object at the other device, the renderer is configured to generate a first content texture including the graphical object, an appearance of the graphical object being determined using the first content information and the first user interaction feedback included in the first interaction information; the renderer is configured to generate a video frame including the first content texture and a second content texture, the second content texture being generated from the first video stream; the display layer is configured to display the video frame; the control layer is configured to receive a second user interaction feedback to the video frame; and the control layer is configured to transmit the second interaction information indicating the user interaction feedback.

The renderer may include at least a first content processor and a second content processor, the first content processor being configured to generate the first content texture, and the second content processor being configured to generate the second content texture.

The renderer may further include a texture processor, the texture processor being configured to blend the first content texture and the second content texture and output the blended content textures as the video frame.

The display layer may be configured to transmit upstream data including at least second content information describing the appearance of the graphical object.

The information processing device may further include a camera device that generates a second video stream, wherein the second video stream is input to the renderer, the renderer is configured to generate the second content texture in response to the second video stream, the renderer is configured to blend the first content texture and the second content texture, and the upstream data includes the blended first content texture and second content texture.

The renderer may be configured to generate the video frame by overlaying the graphical object on the first content texture.

The first interaction information may further indicate a third user interaction feedback to the graphical object at a third device.

The graphical object may show a character in a video game.

Advantageous Effects of Invention

The present disclosure enables synchronization between live streaming and user interaction.

DESCRIPTION OF EMBODIMENTS

1. Configuration

Figure 1:
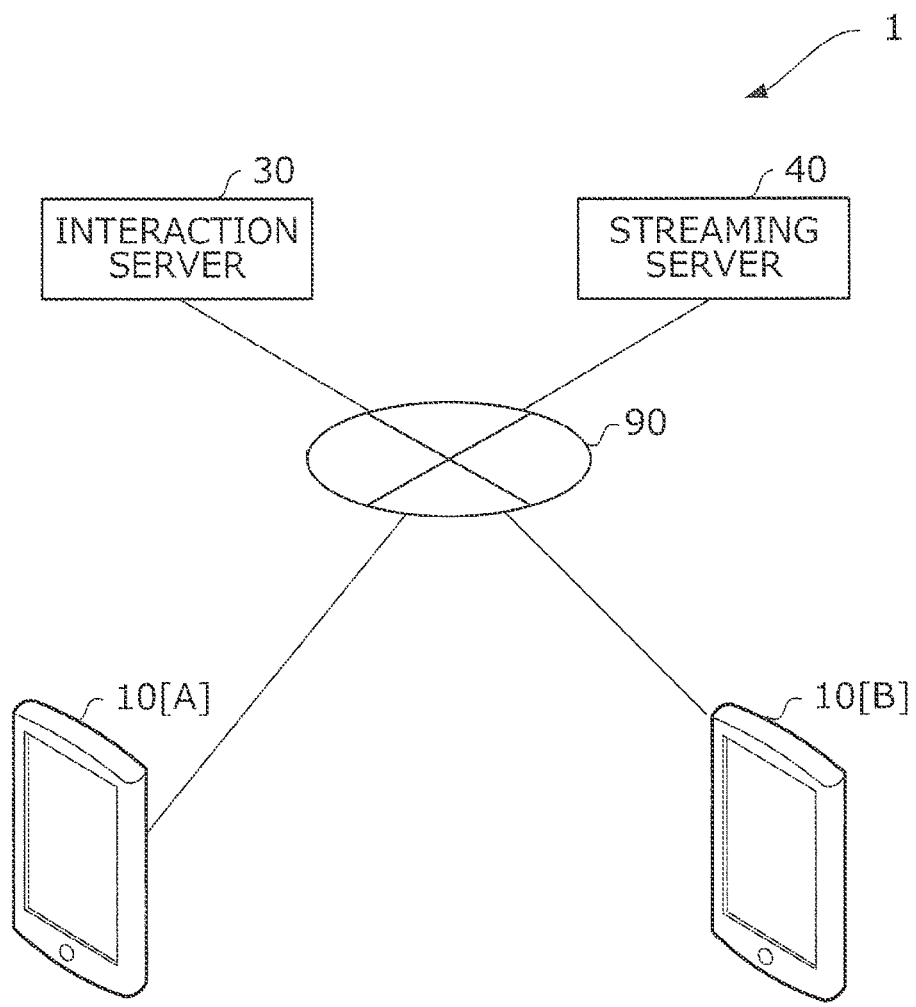
FIG. 1 shows a schematic configuration of a communication system 1 according to one embodiment of the disclosure.

FIG. 1 shows a schematic configuration of a communication system 1 according to one embodiment of the disclosure. The communication system 1 provides a live streaming service with interaction via a content. Here, the term "content" refers to a digital content that can be played on a computer device. In other words, the communication system 1 enables a user to participate in real-time interaction with other users on line. The communication system 1 includes plural user terminals 10, an interaction server 30, and a streaming server 40. The user terminals 10, the interaction server 30, and the streaming server 40 are connected via a network 90, which is the Internet, for example. The interaction server 30 is a server for synchronizing interaction feedbacks. The streaming server 40 is a server for providing live streaming. The user terminals 10 are client devices for the live streaming. A suffix is used to distinguish one user terminal 10 from another, such as user terminal 10[x]. A user terminal 10 used by user A is denoted as user terminal 10[A], and is an example of a first device. A user terminal 10 used by user B is denoted as user terminal 10[B], and is an example of a second device. Each of the user terminal 10, the interaction server 30, and the streaming server 40 is an example of an information-processing device.

Figure 2:
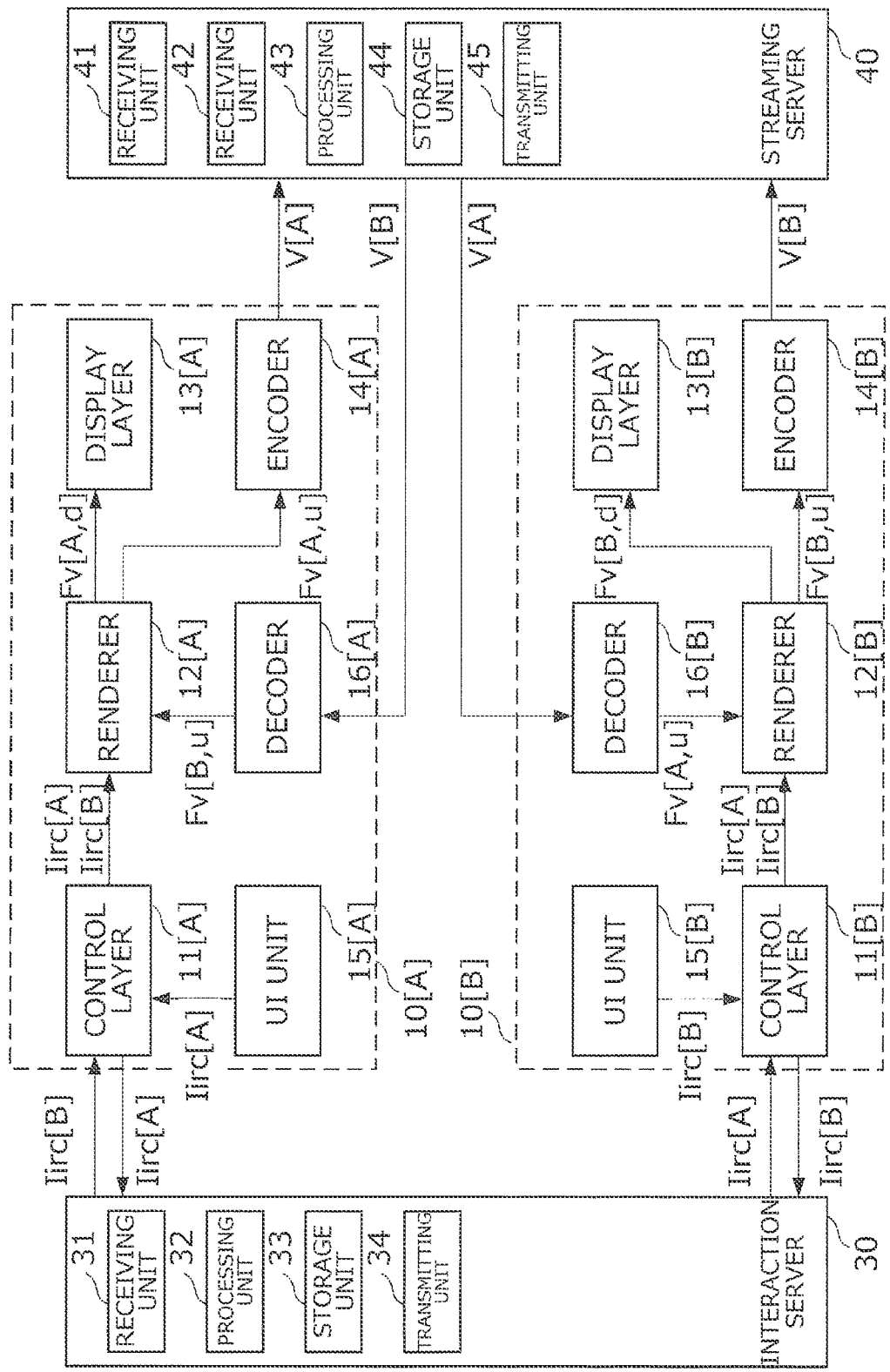
FIG. 2 shows an exemplary functional configuration of the communication system 1.

FIG. 2 shows an exemplary functional configuration of the communication system 1. The communication system 1 includes a receiving unit 31, a processing unit 32, a storage unit 33, a transmitting unit 34, a receiving unit 41, a receiving unit 42, a processing unit 43, a storage unit 44, a transmitting unit 45, a control layer 11, a renderer 12, a display layer 13, an encoder 14, a UI unit 15, and a decoder 16. In this example, the receiving unit 31, the processing unit 32, the storage unit 33, and the transmitting unit 34 are implemented on the interaction server 30. The receiving unit 41, the receiving unit 42, the processing unit 43, the storage unit 44, and the transmitting unit 45 are implemented on the streaming server 40. Each of the functional elements in the user terminal 10 is denoted by a suffix. The control layer 11[A], the renderer 12[A], the display layer 13[A], the encoder 14[A], the UI unit 15[A], and the decoder 16[A] are implemented on the user terminal 10[A]. The control layer 11[B], the renderer 12[B], the display layer 13[B], the encoder 14[B], the UI unit 15[B], and the decoder 16[B] are implemented on the user terminal 10[B].

The communication system 1 handles at least two types of information, interaction information Iirc and content information Ictn. The interaction information can also be said as "control information."

The interaction information Iirc[x] refers to information showing an interaction feedback or operations of user x, to a content played on the user terminal 10[x]. Here, the term "interaction" refers to a reaction made by user x while the user terminal 10[x] plays a content. The term "interaction feedback" refers to feedback or an instruction by user x input to the user terminal 10[x], as the reaction. For example, the interaction feedback includes at least one of clicking, tapping, and dragging a graphical object. For example, the interaction information Iirc[x] describes user operations on interactive graphical objects. More specifically, the interaction information describes to move object O[j] from a coordinate X to a coordinate Y. The interaction information Iirc[A] is an example of a first user interaction feedback.

The content information Ictn[x] generally refers to information that describes, defines, or identifies graphical objects included in a content played on the user terminal 10[x]. If a content is played on the user terminal 10[A], the content information Ictn[A] defines or identifies graphical objects included in the content. If the content includes n content elements, for example, graphical objects (or virtual objects) O[1], O[2], . . . , O[n], the content information Ictn[x, j] describes, defines, or identifies the appearance of the graphical object O[j]. Suppose that the content includes five graphical objects O[1], O[2], O[3], O[4], and O[5]. The graphical objects O[1], O[3], O[4], and O[5] are real-time objects, and the graphical object O[2] is a non real-time object. For example, the content information Ictn[A, 2] describes the coordinate and the size of the graphical object O[2]. The graphical object is a virtual object in a virtual space.

In the communication system 1, each user terminal 10 transmits or pushes its video stream V to the streaming server 40, and receives or pulls a video stream V of another user terminal 10 from the streaming server 40. Further, each user terminal 10 transmits or pushes its interaction information Iirc to the interaction server 30, and receives or pulls interaction information Iirc of another user terminal 10 from the interaction server 30.

Further, each user terminal 10 transmits or pushes its content information Ictn to at least one server, and receives or pulls content information Ictn of another user terminal 10 from the server. In this example, there can be two types of content information, real-time content information and non real-time content information. Here, the term "real-time" means the information of graphical objects are bound to a specific time frame of the live stream. In other words, if the coordinate or size of the graphical object changes by the time, the graphical object is a real-time object. For example, the size of a real-time graphical object is 15 pixels×15 pixels at 00:00:30 of a live stream, and is 20 pixels×20 pixels at 00:00:31. On the other hand, if the coordinate or size of the graphical object is defined stable and does not changes by the time in a certain time period, the graphical object is a non real-time object.

The communication system 1 has two paths for synchronizing the content information Ictn between the user terminal 10[A] and the user terminal 10[B]. One path is via the interaction server 30 and the other path is via the streaming server 40. In this example, the real-time content information is communicated via the streaming server 40 while the non real-time content information is communicated via the interaction server 30. A single application can communicate the content information Ictn via these two paths.

Figure 3:
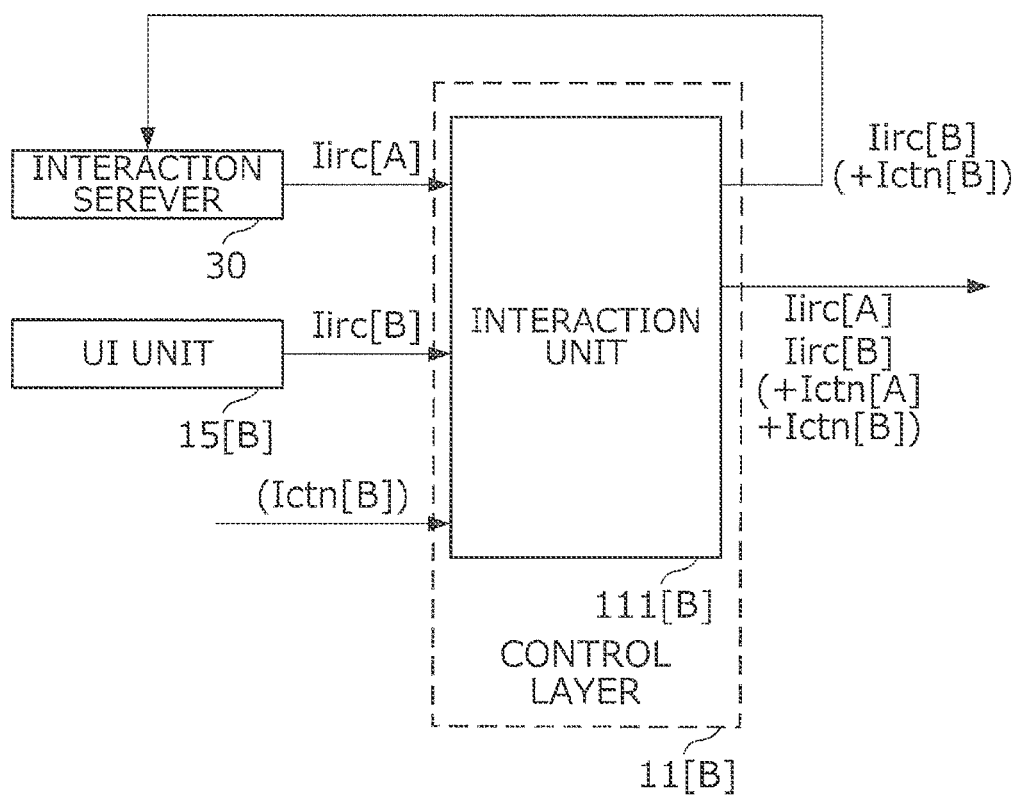
FIG. 3 shows an exemplary detailed functional configuration of the control layer 11[B].

FIG. 3 shows an exemplary detailed functional configuration of the control layer 11[B]. The control layer 11[B] has the following functions: (i) receiving or retrieving interaction information Iirc[A] and Iirc[B]; (ii) receiving or retrieving content information Ictn[A] and/or Ictn[B] for non real-time objects; (iii) transmitting, pushing, or uploading the interaction information Iirc[B] to the interaction server 30; and (iv) outputting the interaction information Iirc[A] and Iirc[B] to the renderer 12[B].

The control layer 11[B] includes an interaction unit 111 [B]. The interaction unit 111[B] receives the interaction information Iirc[A] from the interaction server 30. The interaction information Iirc[A] refers to information including interaction information Iirc[A] and content information Ictn[A] (Iirc and Ictn are not shown in the figure). The interaction information Iirc[A] is an example of first interaction information. The interaction unit 111[B] receives the content information Ictn[A] for non real-time objects from the interaction server 30.

The interaction unit 111[B] receives the interaction information Iirc[B] from the UI unit 15[B]. With the example that the content includes five graphical objects O[1], O[2], O[3], O[4], and O[5], the interaction information Iirc[B] describes user operations on each graphical object. More specifically, the interaction information describes to move object O[j] from a coordinate X to a coordinate Y.

Further, the interaction unit 111[B] receives the content information Ictn[B] for non real-time objects from the renderer 12[B], which will be described later. The content information Ictn[B] describes, defines, or identifies a non real-time content element in a content played on the user terminal 10[B]. The non real-time content element is the graphical object O[2], for example.

The interaction unit 111[B] transmits to the interaction server 30 the received interaction information Iirc[B]. In one example, the interaction unit 111[B] transmits the received interaction information Iirc[B] at fixed intervals. Further, the interaction unit 111[B] may transmit the content information Ictn[B] for non real-time objects, to the interaction server 30.

The interaction unit 111[B] outputs all the received interaction information Iirc to the renderer 12[B]. In this example, the interaction unit 111[B] outputs the interaction information Iirc[A] and the interaction information Iirc[B] at fixed intervals. Further, the interaction unit 111[B] outputs the content information Ictn[A] and Ictn[B] for non real-time objects, to the renderer 12[B].

Figure 4:
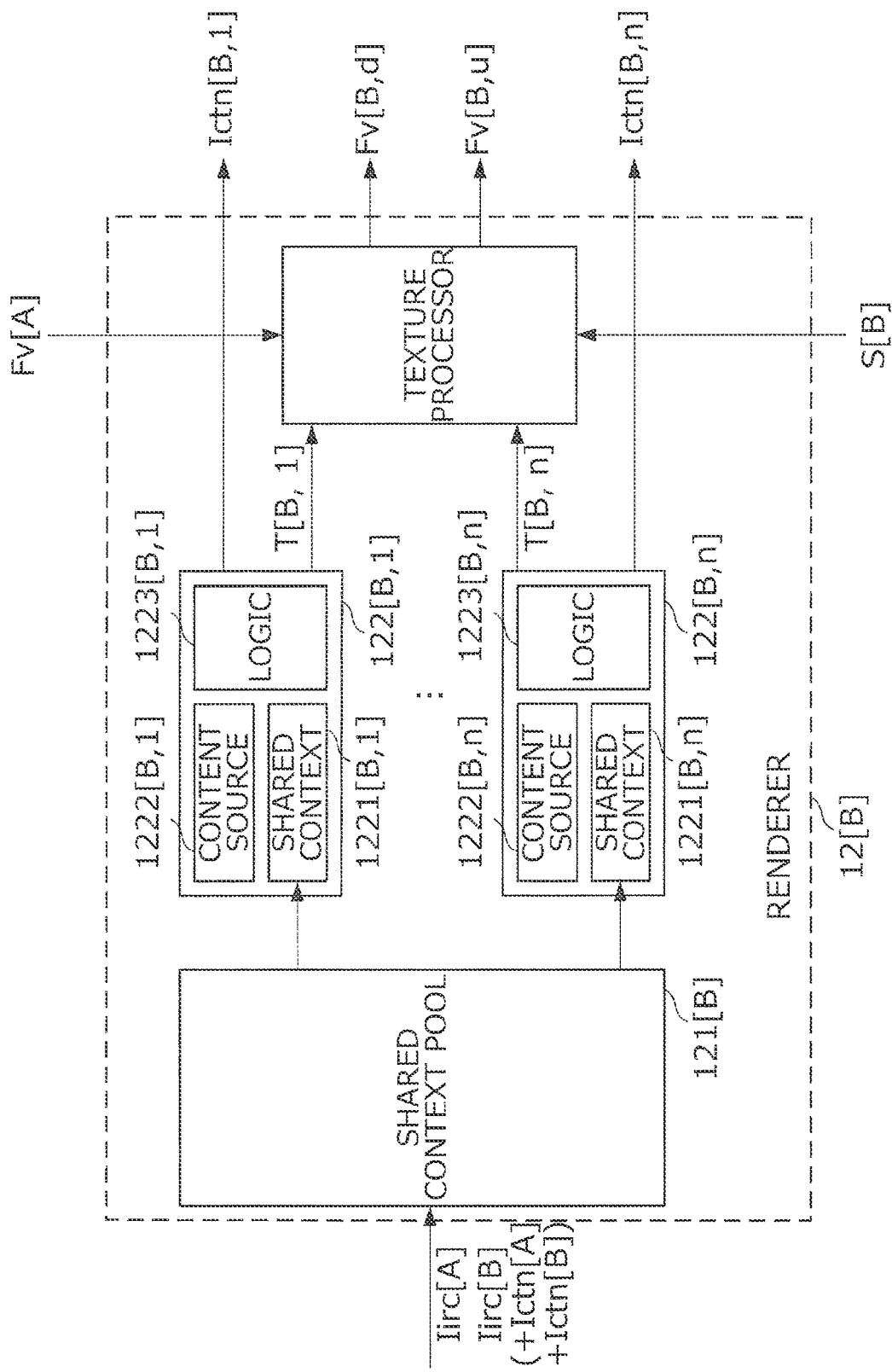
FIG. 4 shows an exemplary detailed functional configuration of the renderer 12[B].

FIG. 4 shows an exemplary detailed functional configuration of the renderer 12[B]. The renderer 12[B] has the following functions: (i) receiving or retrieving interaction information Iirc[A] and Iirc[B] from the control layer 11[B]; (ii) receiving or retrieving content information Ictn[A] and Ictn[B] for the non real-time objects, from the control layer, (iii) receiving or retrieving a video frame Fv[A, u] from the decoder 16[B]; (iv) receiving or retrieving a video signal S[B] from camera 107[B]; (v) outputting video frames Fv[B, d] and Fv[B, u]; and (vi) outputting content information Ictn[B, k].

The renderer 12[B] includes a shared context pool 121 [B], plural content processors 122[B, k], and a texture processor 123[B]. Each content processor 122[B, k] includes a shared context 1221[B, k], a content source 1222[B, k], and a logic 1223[B, k].

The shared context pool 121[B] stores or pools shared context. The shared context refers to a context shared with plural content processes. Here, the context refers to a rendering context. The shared context pool 121[B] receives and stores the interaction information Iirc[A] and Iirc[B] from the control layer 11[B]. Further, the shared context pool 121[B] receives and stores the content information Ictn[A] and Ictn[B] for non real-time objects, from the control layer 11. Still further, the shared context pool 121[B] receives and stores the content information Ictn[A] and Ictn[B] from the decoder 16[B].

The content processor 122[B] processes a content. Here, to "process a content" refers to determining or changing an output of the content, for example, determining or changing an appearance of a graphical object or virtual space in the content.

A content element is allocated to a content processor 122[B]. For example, the graphical objects O[1], O[2], O[3], O[4], and O[5] in the content are allocated to the content processor 122[B, 1], 122[B, 2], 122[B, 3], 122[B, 4], and 122[B, 5], respectively.

The shared context 1221[B, k] stores the content information Ictn[A] and Ictn[B] and the interaction information Iirc[A] and Iirc[B], which are read from the shared context pool 121[B]. The shared context 1221[B, k] stores the contexts relating to the content element, which is allocated to the content processor 122[B, k]. The content source 1222[B, k] stores data used for rendering a graphical object in the content. The logic 1223[B, k] generates and outputs a texture T[B, k]. For example, the content processor 122[B, 1] generates and outputs a texture T[B, 1], which is an example of a first content texture. Here, the term "texture" refers to a still image that is captured by a virtual camera in the virtual space or a real camera device in the real space. In this example, the content processor 122[B, 1] processes the graphical object O[1] in the content. Therefore, the texture T[B, 1] includes an appearance of the graphical object O[1]. The content processor 122[B, 1] determines an appearance of the graphical object O[1]. The appearance of the graphical object O[1] is determined using the interaction information Iirc[A] and Iirc[B]. More specifically, the appearance of the graphical object O[1] is determined using the content information Ictn[A] and Ictn[B] and the interaction information Iirc[A] and Iirc[B]. Similarly, the content processor 122[B, 2] processes the graphical object O[2] in the content, for example.

The texture processor 123[B] receives plural textures T[B, k]. Specifically, the texture processor 123[B] receives textures T[B, 1], T[B, 2], . . . , and T[B, n] from the content processors 122[B, 1], 122[B, 2], . . . , and 122[B, n], respectively.

The texture processor 123[B] receives a video frame Fv[A] from the decoder 16[B]. The decoder 16[B] receives downstream data Dd[A] from the streaming server 40. The downstream data Dd[A] refers to downstream data including a video stream V[A]. If the video stream V[A] includes a real-time content element, more specifically, graphical object O[j] which is a real-time object, the downstream data Ds[A] further includes the content information Ictn[A, j] for the graphical object O[j]. A video stream V[x] refers to a video stream originated from the user terminal 10[x]. The video stream V[x] is shot by camera 107[x]. For example, the video stream V[A] denotes a video stream originated from the user terminal 10[A] and is an example of a first video stream. Here, the content information Ictn[A] is an example of first content information. The decoder 16[B] decodes the received downstream data Dd[A] and generates the video frame Fv[A], which is a component of the video stream V[A]. The video frame Fv[A] is an example of a second content texture.

The texture processor 123[B] processes the received textures T. Here, to "process textures" means to blend at least one texture T with the video frame Fv. The texture processor 123[B] generates and outputs a video frame Fv[B, d]. The video frame Fv[B, d] is generated by blending plural textures T[B] and the video frame Fv[A]. The texture processor 123[B] outputs the video frame Fv[B, d] to the display layer 13[B]. Here, the suffix "d" denotes that the data is for the display.

Further, the texture processor 123[B] receives a video signal S[B] from the camera 107[B]. The texture processor 123[B] generates a video frame Fv[B, u] from the video signal S[B]. The texture processor 123[B] outputs the video frame Fv[B, u] to the encoder 14[B]. Here, the suffix "u" denotes that the data is for upstreaming.

If the graphical object O[k] is a real-time object, the content processor 122[B, k] outputs the content information Ictn[B, k] to the encoder 14[B]. If the graphical object O[k] is not a real-time content, the content processor 122[B, k] outputs the content information[B, k] to the interaction server 30. Alternatively, if the graphical object O[k] is not a real-time content, the content processor 122[B, k] outputs the content information[B, k] to a transmitter (not shown in the figures) that transmits the information to the interaction server 30. Whether the graphical object O[k] is a real-time object or not is defined in the content information Ictn[k], for example. For another example, whether the graphical object O[k] is a real-time content or not is defined by the client application APP.

The display layer 13[B] previews or shows the video frame Fv[B, d] on the computer screen of the user terminal 10[B].

The encoder 14[B] encodes the video frame Fv[B, u] and generates upstream data Du[B]. The upstream data Du[B] includes encoded video frame Fv[B, u] and the content information Icnt[B]. The content information Icnt[B] is an example of second content information. Further, the encoder 14[B] transmits the upstream data Du[B] to the streaming server 40.

The user terminal 10[A] has the same functions as the user terminal 10[B]. For the user terminal 10[A] the above description for the user terminal 10[B] should be read with the suffixes A and B switched.

Referring to FIG. 2 again, in the interaction server 30, the storage unit 33 stores various data and programs. The receiving unit 31 receives various items of information from the user terminals 10. For example, the receiving unit 31 receives the interaction information Iirc[A] from the user terminal 10[A] and receives the interaction information Iirc[B] from the user terminal 10[B].

The processing unit 32 determines the destination of the received interaction information Iirc. If the interaction information Iirc originates from a streamer, the processing unit 32 determines the destination to be viewers who are viewing the live stream by the streamer. If the interaction information Iirc originates from a viewer, the processing unit 32 determines the destination to be the streamer whose live stream the viewer is viewing.

The transmitting unit 34 transmits the interaction information Iirc, to the determined destination. For example, the transmitting unit 34 transmits the interaction information Iirc[B] to the user terminal 10[A] and transmits the interaction information Iirc[A] to the user terminal 10[B].

In server 40, the storage unit 44 stores various data and programs. The receiving unit 41 receives the video stream V[A] and the content information Ictn[A] from the user terminal 10[A]. The receiving unit 41 further receives video stream V[B] and the content information Ictn[B] from the user terminal 10[B]. The receiving unit 42 receives the interaction information Iirc[A] and the content information Ictn[A] from the user terminal 10[A]. The receiving unit 42 further receives the interaction information Iirc[B] and the content information Ictn[B] from the user terminal 10[B].

The processing unit 43 determines the destination of the received video streams V. If the video stream V originates from a streamer, the processing unit 43 determines the destination to be viewers who are viewing the live stream by the streamer. If the video stream V originates from a viewer, the processing unit 43 determines the destination to be the streamer whose live stream the viewer is viewing. The transmitting unit 45 transmits the video streams V to the determined destination. For example, the transmitting unit 45 transmits the video stream V[A] to the user terminal 10[B] and transmits the video stream V[B] to the user terminal 10[A].

Figure 5:
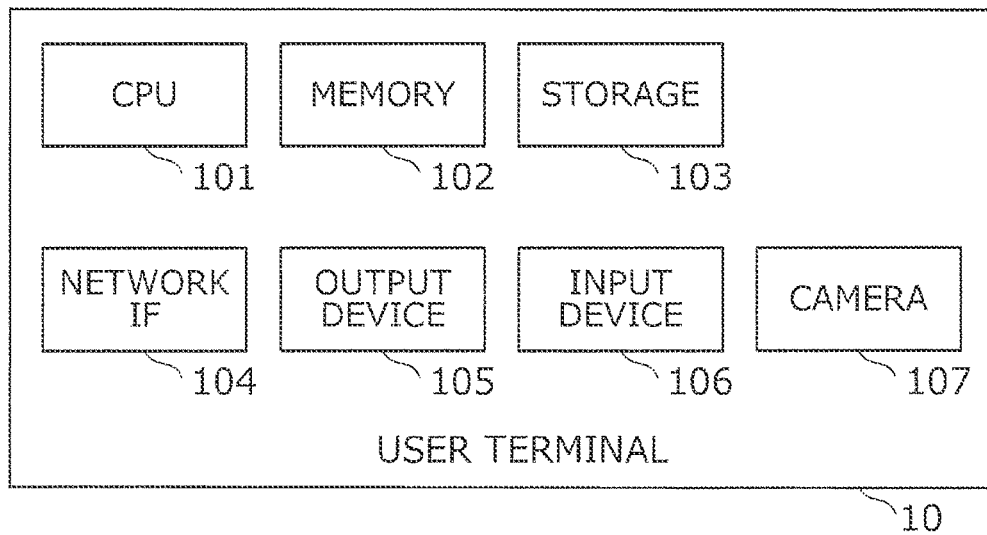
FIG. 5 shows an exemplary hardware configuration of the user terminal 10.

FIG. 5 shows an exemplary hardware configuration of the user terminal 10. The user terminal 10 is a computer device including a CPU 101, a memory 102, a storage 103, a network interface 104, an output device 105, an input device 106, and a camera 107. The user terminal 10 is, for example, a smartphone, a tablet device, or a personal computer. The CPU 101 executes a process in accordance with a program. The memory 102 is a primary storage that functions as a workspace while the CPU 101 executes a program. The memory 102 includes, for example, a RAM (Random Access Memory). The storage 103 is a secondary storage that stores various data and programs. The storage 103 is, for example, a SSD (Solid State Drive) or a HDD (Hard Disk Drive). The network interface 104 communicates with other computer devices such as the interaction server 30 and the streaming server 40. The output device 105 outputs information. The output device 105 includes, for example, at least one of a display and a speaker. The input device 106 receives an input of an instruction or data from a user. The input device 106 includes, for example, at least one of a touchscreen, a keyboard, a pointing device, and a microphone. The camera 107 captures a scene and generates a still image or a video.

In this example, the storage 103 stores a program causing a computer device to function as a client device in the interaction service. Hereinafter, the program is referred to a "client program" and a set of functions provided by the client program is referred to as a "client application APP." By the CPU 101 executing the client application program, the functions shown in FIG. 2 are implemented on the user terminal 10. The CPU 101 executing the client application program is an example of the control layer 11, the renderer 12, the display layer 13, the UI unit 15, and the decoder 16. In other words, the control layer 11, the renderer 12, the display layer 13, the UI unit 15, and the decoder 16 are software components of the client application APP.

Figure 6:
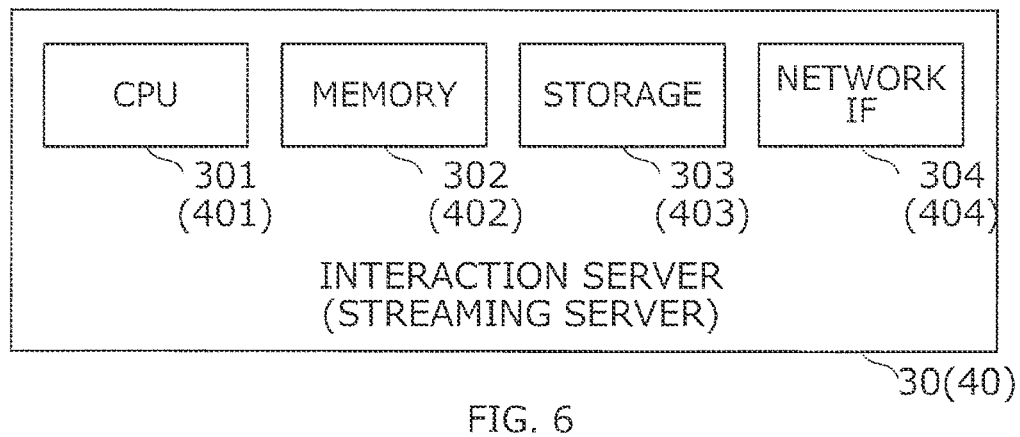
FIG. 6 shows an exemplary hardware configuration of the interaction server 30 (and server 40).

FIG. 6 shows an exemplary hardware configuration of the interaction server 30 (and the streaming server 40). The interaction server 30 is a computer device including a CPU 301, a memory 302, a storage 303, and a network interface 304. The CPU 301 executes a process in accordance with a program. The memory 302 is a primary storage that functions as a workspace while the CPU 301 executes a program. The memory 302 includes, for example, a RAM. The storage 303 is a secondary storage that stores various data and programs. The storage 303 is, for example, a HDD or a SSD. The network interface 304 communicates with other computer devices such as the user terminals 10.

In this example, the storage 303 stores a program for causing a computer device to function as an interaction server 30 in the interaction service. Hereinafter, the program is referred to as "interaction server program." By the CPU 301 executing the interaction server program, the functions shown in FIG. 2 are implemented on the interaction server 30. The CPU 301 executing the interaction server program is an example of the processing unit 32. The network interface 304 is an example of the receiving unit 31 and the transmitting unit 34. At least one of the memory 302 and the storage 303 is an example of the storage unit 33.

The streaming server 40 has the same hardware configuration as the interaction server 30. In this example, the storage 403 stores a program causing a computer device to function as a streaming server in the interaction service. Hereinafter, the program is referred to as "streaming server program." By the CPU 401 executing the streaming server program, the functions shown in FIG. 2 are implemented in the streaming server 40. The CPU 401 executing the streaming server program is an example of the processing unit 43. The network interface 404 is an example of the receiving unit 41, the receiving unit 42, and the transmitting unit 45. At least one of the memory 402 and the storage 403 is an example of the storage unit 44.

2. Operation

Figure 7:
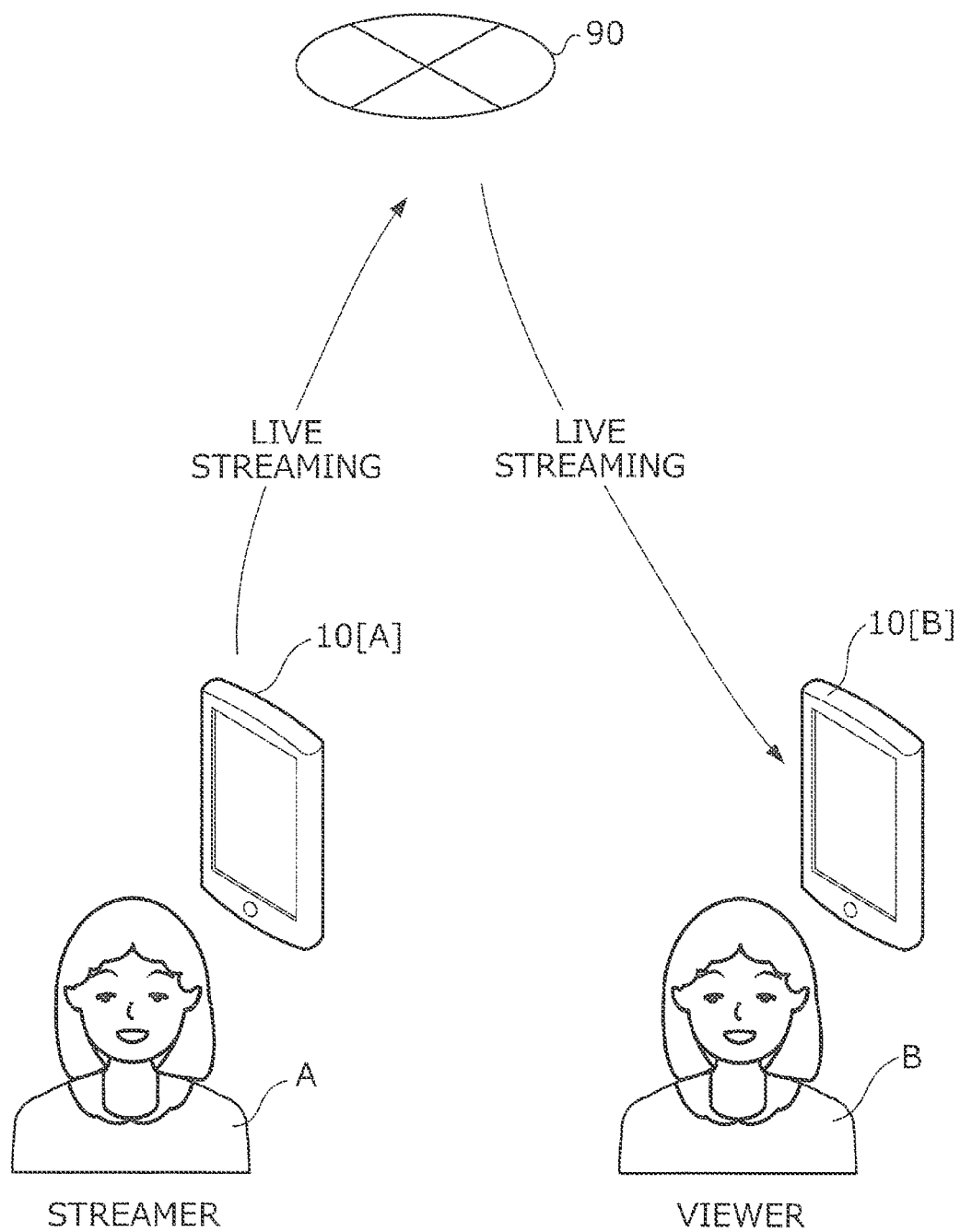
FIG. 7 shows an exemplary case of use of the communication system 1.

FIG. 7 shows an exemplary case of use of the communication system 1. An exemplary operation of the communication system 1 will be described with reference to this case. In this example, a user (hereinafter, a "streamer") provides a live streaming with the user terminal 10[A] (which is also referred to as a "streamer's device"). Another user (hereinafter, a "viewer") views the live streaming with the user terminal 10[B] (which is also referred to as a "viewer's device"). Although the communication system 1 may have plural viewers for a single streamer, a single viewer is shown in FIG. 7 for simplification.

In this example, the communication system 1 provides a video game, which is an example of the content, for users while the streamer provides live streaming. The streamer can play a video game and the viewers can join the video game. The video game screens are shown on the user terminals 10[A] and 10[B], and they are synchronized. Thus, the communication system 1 allows a streamer and viewers to interact via a video game along with a live stream.

Before starting live streaming and viewing the live streaming, the communication system 1 requires users to register in the communication system 1. Each of the users inputs his/her profile and the communication system 1 stores the profile in a user database (not shown in the figures). A user logs into the communication system 1 when the client application APP is activated.

Figure 8:
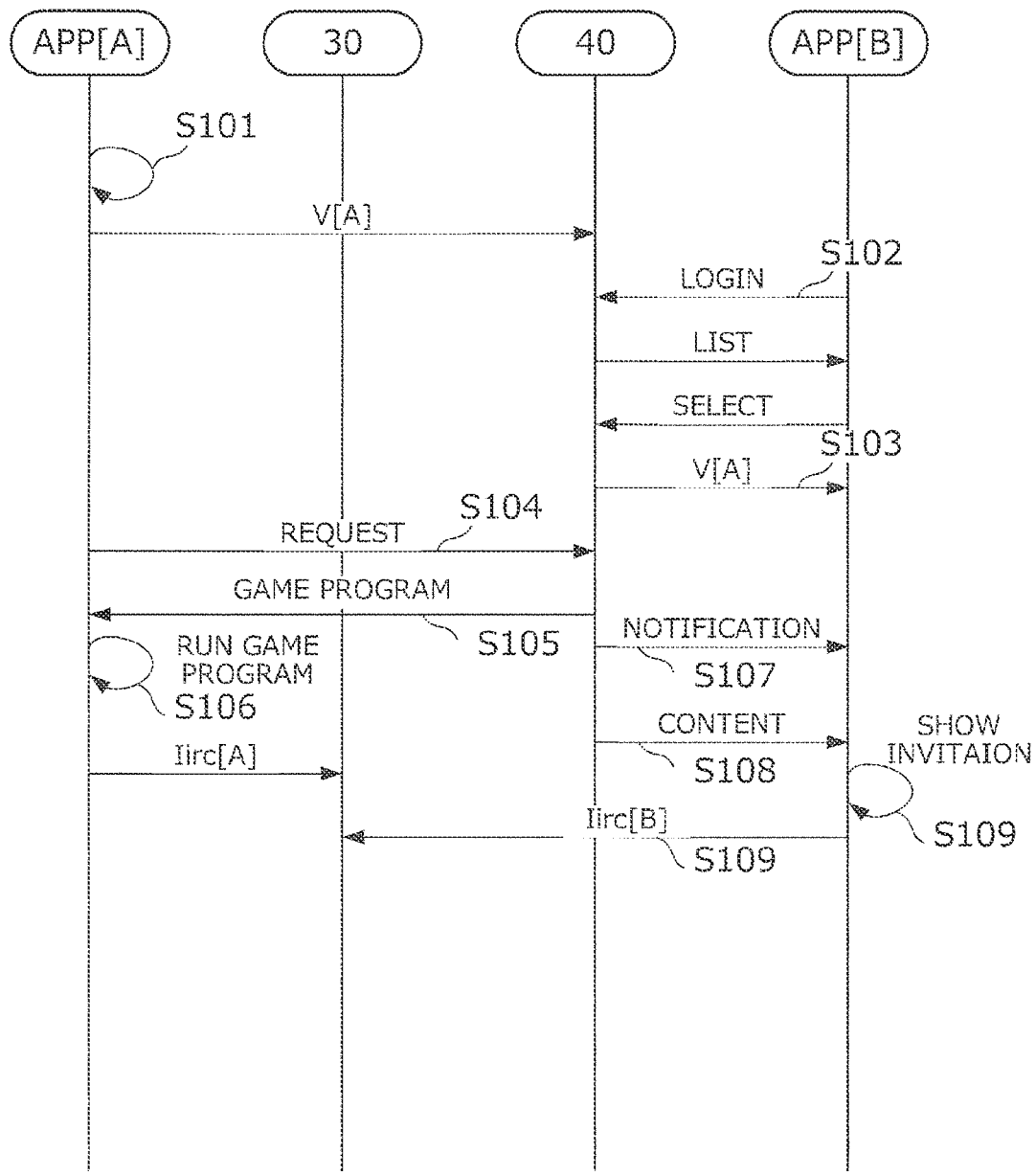
FIG. 8 shows an exemplary sequence chart illustrating an operation of the communication system 1.

FIG. 8 shows an exemplary sequence chart illustrating an operation of the communication system 1. In step S101, the client application APP in the user terminal 10[A](hereinafter, referred to as a "client application APP[A]") starts live streaming, in response to an instruction by the streamer. Here, the live stream includes a video stream shot with the camera 107[A]. The video stream is referred to as a video stream V[A] hereinafter. In many cases, the video stream shows a selfie image of the streamer.

In step S102, the client application APP in the user terminal 10[B] (hereinafter, referred to as a "client application APP[B]") accesses the communication system 1, in response to an instruction by a user who is a potential viewer. More specifically, the client application APP[B] accesses the streaming server 40 to log in. The streaming server 40 provides accessing users a streamers list that shows streamers who are currently distributing or pushing live streams. The client application APP[B] selects from the streamers list a streamer to view his/her live stream, in response to the user's instruction. The streaming server 40 starts (in step S103) to transmit to the user terminal 10[B] the live stream of the selected streamer. Then, the user views the live stream on user terminal 10[B] and becomes the viewer.

The communication system 1 provides streamers an optional menu. The optional menu includes an option to play a video game, which is an example of a content. The communication system 1 provides plural video game titles. These video game titles may be provided by either the platformer of the communication system 1 or third parties. The streamer can select a video game title to be played. The client application APP[A] selects the video game title, in response to an instruction by the streamer. If the client application APP[A] selects a video game to be played, the client application APP[A] transmits (in step S104) the streaming server 40 a request to activate the selected video game. In response to the request, the streaming server 40 transmits (in step S105) the user terminal 10[A] data relating to selected content, which is a game program of the selected video game title in this example. The game program is a plugin, for example. The client application APP[A] runs or executes (in step S106) the game program.

Figure 9:
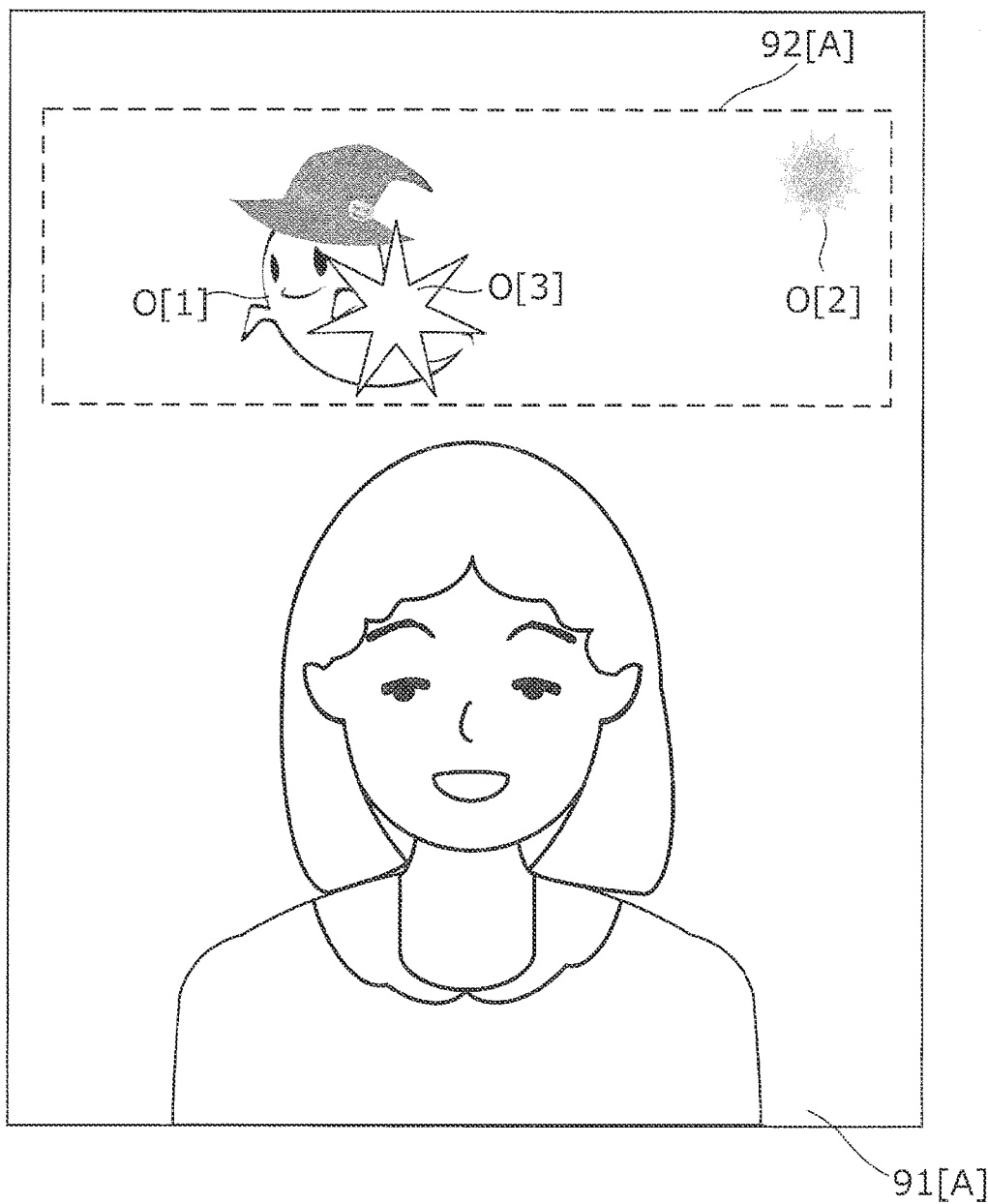
FIG. 9 shows an exemplary screen of the client application with the video game, in the user terminal 10[A].

FIG. 9 shows an exemplary screen of the client application APP[A] with a video game screen. The screen of the client application APP[A] has two areas, an area 91[A] and an area 92[A]. The area 91[A] is a display area to show the streamer's video stream (the video stream V[A], in this example). The area 92[A] is a display area to show the video game screen. In this example, area 92[A] is overlayed on area 91[A]. Graphical objects O[1], O[2], and O[3] are shown on the video game screen. The graphical object O[1] is a monster, the graphical object O[2] is a sun, and the graphical object O[3] is a visual effect applied to the monster. The streamer can attack the monster by tapping the touchscreen of the user terminal 10[A], for example. The graphical objects O[1] and O[3] are real-time objects while the graphical object O[2] is a non real-time object.

Referring to FIG. 8 again, if a content is activated on the streamer's device (the user terminal 10[A] in this example), the streaming server 40 notifies (in step S107) the viewers of the live stream that the content is activated on the streamer's device. In other words, the streaming server 40 transmits to the viewers' device (the user terminal 10[B] in this example) a notification including the identification of the content. Further, the streaming server 40 transmits (in step S108) data showing objects relating to the content, to the viewers' device. In this example, the streaming server 40 transmits data showing objects O[4], O[5], and O[6]. The objects O[4], O[5], and O[6] are items to help the player (in this example, the streamer) in the video game. After receiving the notification and the game program, the client application APP[B] shows (in step S109) the game screen and a UI object. The UI object includes a message to invite the viewers to join the video game.

Figure 10:
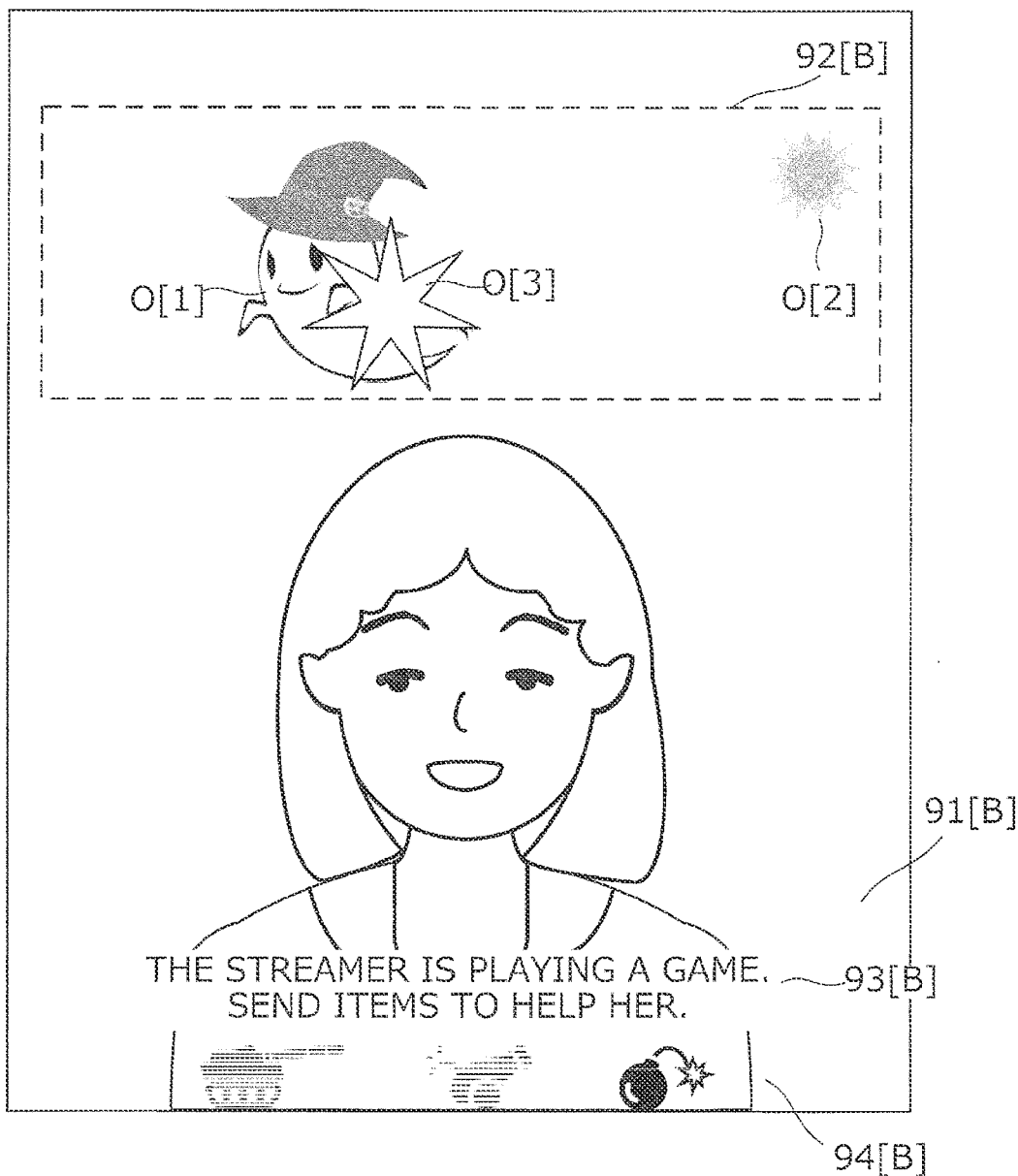
FIG. 10 shows an exemplary screen of the client application with the invitation, in the user terminal 10[B].

FIG. 10 shows an exemplary screen of the client application APP[B] with the invitation. The client application APP[B] has areas 91[B], 92[B], 93[B], and 94[B]. The area 91[B] is a display area to show the streamer's video stream (the video stream V[A], in this example). Since the video stream V[A] includes the streamer's image and the video game screen, the video game screen is also shown in the area 91[B]. The viewer can view the streamer playing the video game in area 91[B]. The area 92[B] is a display area to show the video game screen. The area 93[B] is an area for showing a message to invite the viewer to join the video game. In this example, the message says "The streamer is playing a game. Send items to help her." The area 94[B] is an area for showing icons corresponding to options that the viewer can take. In this example, the viewer can send an item to help the streamer, and has three options as potential items to be sent. These options correspond to the objects O[4], O[5], and O[6], which are a tank, a cannon, and a bomb, for example. The viewer can instruct the client application APP[B] to send an item to the streamer, by tapping an icon corresponding to the object O[6], a bomb, for example. Tapping the icon is an example of the interaction feedback of the viewer.

Referring to FIG. 8 again, since the client application APP[B] periodically transmits the interaction information Iirc[B] to the interaction server 30, the interaction information Iirc[B] showing that the viewer has sent the object O[6] to the streamer is transmitted to the interaction server 30. The interaction server 30 transmits the interaction information Iirc[B] to the user terminal 10[A], the streamer's device.

In the streamer's device, the client application APP[A] receives the interaction information Iirc[B]. Since the interaction information Iirc[B] shows that the object O[6] is sent to the streamer, the content processor 122[B] generates a texture showing the object O[6]. Then, the client application APP[A] shows a video game screen along with the object O[6].

Figure 11:
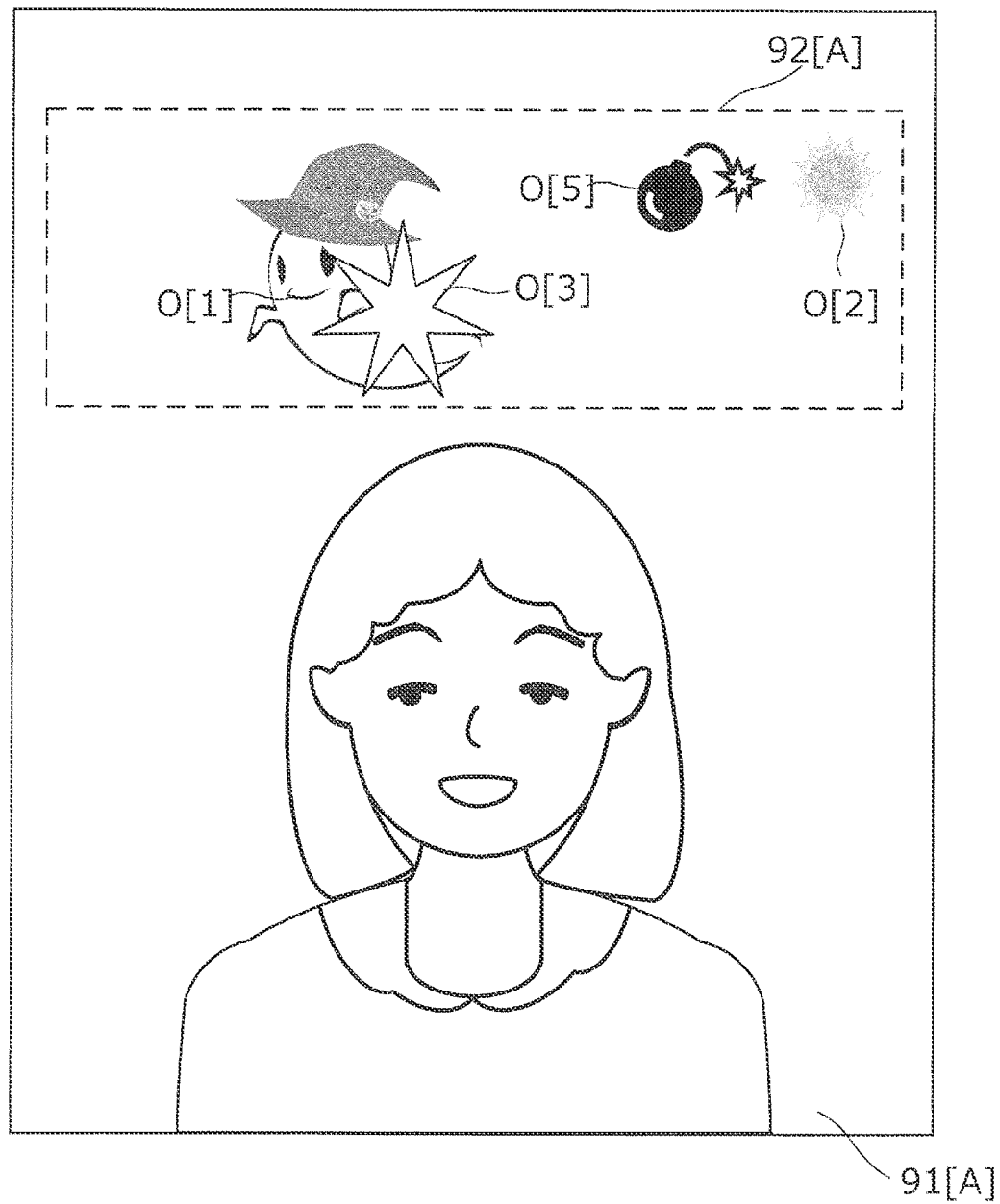
FIG. 11 shows an exemplary screen of the client application with the video game, in the user terminal 10[B].

FIG. 11 shows an exemplary screen of the client application APP[A] with the video game. In this example, the object O[6] is not activated until the streamer makes an interaction feedback on the object O[6]. For example, as a result of dragging the object O[6] onto the object O[1], the object O[6] is activated. In this way, the streamer can use an item sent from the viewer, in the video game. In other words, the streamer and the viewer can cooperate to beat the monster.

Since the area 91[B] in the user terminal 10[B] synchronizes with the area 91[A] in the user terminal 10[A], the video game screen is also shown in the area 91[B]. Thus, the viewer can view the video game screen where the viewer helps the streamer to beat the monster.

Description will be given for how the area 92[A] and the area 92[B] synchronize.

Figure 12:
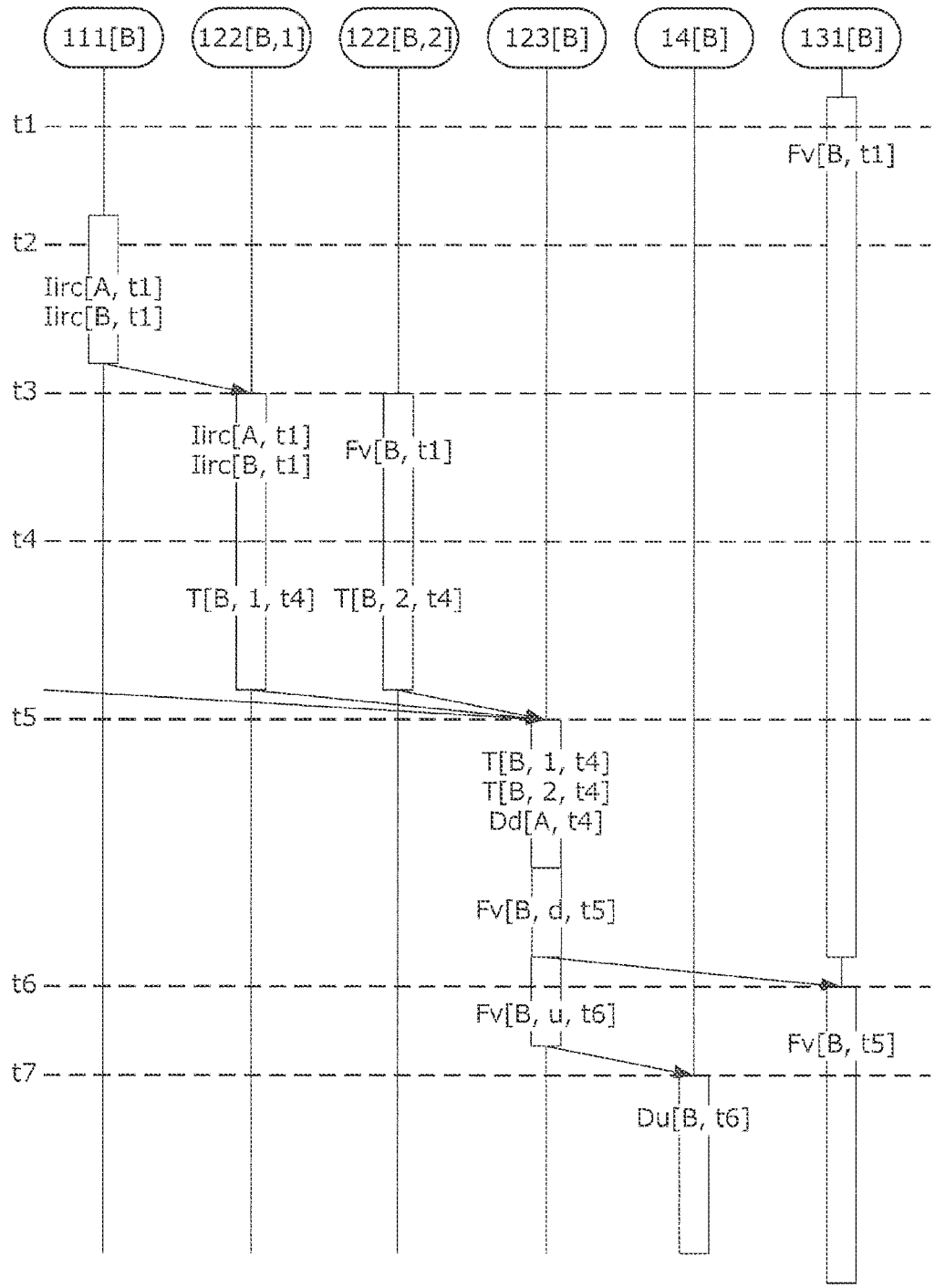
FIG. 12 schematically illustrates an exemplary scenario for the interaction.

FIG. 12 schematically illustrates an exemplary scenario for the interaction. Before the sequence shown in FIG. 11, the video game has been activated on the user terminal 10[A]. User A is the streamer and user B is the viewer. FIG. 12 focuses on the operation in the user terminal 10[B]. In this scenario, the renderer 12[B] has two content processors, a content processor 122[B, 1] and a content processor 122[B, 2]. The client application APP[B] allocates the content processor 112[B, 1] to process the video game, and allocates the content processor 112[B, 2] to process the video stream V[A]. The video game is an example of a content. The video stream V[A] is an example of another content. In this example, rendering functions relating to the video game are installed to the content processor 122[B, 1]. Rendering functions relating to the video stream are installed to the content processor 122[B, 2].

At time t1, the display layer 13[B] shows the video frame Fv[B, t1]. The video frame Fv[B, t1] includes a streamer's selfie image and the graphical object O[1], which shows a monster in the video game. The viewer taps an icon from among the options in the user terminal 10[B] to send an item to the streamer. The tap is an example of the interaction feedback. In response to the tap, UI unit 15[B] generates interaction information Iirc[B, t1]. The interaction information Iirc[B, t1] includes: (i) the identification of the viewer, (ii) the identification of the content, (iii) the identification of the object that is the target of the feedback (for example, the object O[6]), and (iv) parameters showing an amount and/or a strength of the interaction feedback. For example, the parameters show at least one of (a) the coordinates of the tapped position, (b) the time duration from when the tap starts to when the tap ends, (c) the trajectory of the tap (or swipe), (d) the time stamp indicative of when the tap starts or ends. For a more detailed example, the parameters show an item that has been selected to help the streamer.

At time t2, the interaction unit 111[B] receives interaction information Iirc[A, t1] from the interaction server 30, and receives interaction information Iirc[B, t1] from the UI unit 15[B]. Similarly to the interaction information Iirc[B, t1], the parameters included in the interaction information Iirc [A, t1] show how strongly the streamer hits the monster or the location at which the streamer drops the bomb, for example.

Further, the interaction unit 111[B] transmits the interaction information Iirc[B, t1] to the interaction server 30. Receiving the interaction information Iirc from the user terminal 10, the interaction server 30 determines the destination of the interaction information Iirc and transmits the interaction information Iirc to the destination. In this example, the interaction server 30 transmits the interaction information Iirc[B, t1] to the user terminal 10[A] (Operations in the interaction server 30 is not shown in the figure).

The interaction unit 111[B] determines the destination of the interaction information. In this example, the interaction unit 111[B] determines the destination on the basis of the identification of the content included in the interaction information. If the interaction information Iirc[A, t1] includes an identification of the graphical object O[5], the interaction unit 111[B] determines that the destination of the interaction information Iirc[A, t1] is the content processor 122[B, 5], to which the graphical object O[5] is allocated. Similarly, if the interaction information Iirc[B, t1] includes an identification of the graphical object O[5], the interaction unit 111[B] determines that the destination of the interaction information Iirc[B, t1] is the content processor 122[B, 5], to which the graphical object O[5] is allocated.

At time t3, the interaction unit 111[B] outputs the interaction information Iirc[A, t1] and Ictr[B, t1] to the content processor 122[B, 5], which is their destination, respectively. The content processor 122[B, 5] processes the graphical object O[5] on the basis of the received interaction information Iirc[A, t1] and Ictr[B, t1]. For example, the content processor 122[B, 5] calculates damage caused to the monster, with parameters showing how strongly the streamer hits the monster or the location at which the streamer drops the bomb. The content processor 122[B, 1] determines an appearance of the graphical object O[3], based on the calculation. The graphical object O[3] shows a visual effect of the attack by the streamer. Further, the content processor 122[B, 1] determines an appearance of the graphical object O[5], based on the calculation. The graphical object O[5] shows the item that user B sent to user A. Still further, the content processor 122[B, 1] determines an appearance of the monster on the basis of the calculated damage.

At time t4, the content processor 122[B, 1] generates or renders texture T[B, 1, t4]. The texture T[B, 1, t4] shows a still image showing the graphical objects O[1], O[2], O[3], and O[5]. In rendering these graphical objects, the content processor 122[B, 1] reads data from the shared context pool 121[B] to obtain data relating to the coordinate and appearance of these graphical objects.

Further, the content processor 122[B, 2] generates or renders texture T[B, 2, t4]. The texture T[B, 2, t4] shows a video frame captured by camera 107[B]. The video frame shows the viewer's selfie image, for example.

At time t5, the texture processor 123[B] receives the texture T[B, 1, t4] from the content processor 122[B, 1], the texture T[B, 2, t4] from the content processor 122[B, 1], and the downstream data Dd[A, t4] from the streaming server 40. The downstream data Dd[A, t4] includes data to generate a video frame Fv[A, t4]. The texture processor 123[B] generates the video frame Fv[A, t4] from the downstream data Dd[A, t4]. The texture processor 123[B] generates a new video frame Fv[B, t5] by blending the video frame Fv[A, t4] and at least one texture T output from the content processors 122[B]. Which texture has to be blended with the video frame Fv[A, t4], is determined or instructed by the client APP[B]. In this example, the client APP[B] instructs the texture processor 123[B] to blend the texture[B, 1] with the video frame Fv[A, t4], since the texture[B, 1] relates to the video game, which is an activity the viewer has instructed to activate.

Figure 13:
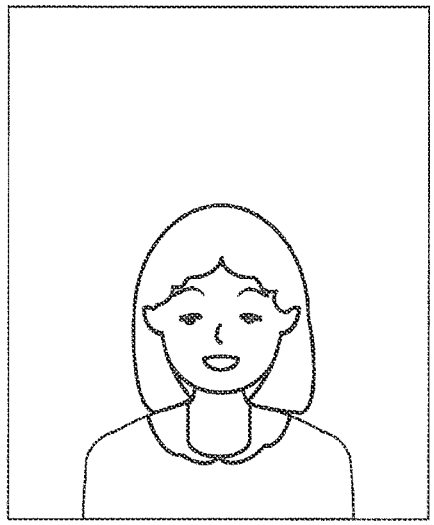
FIG. 13 illustrates the blending of a texture and a video frame.
Figure 13:
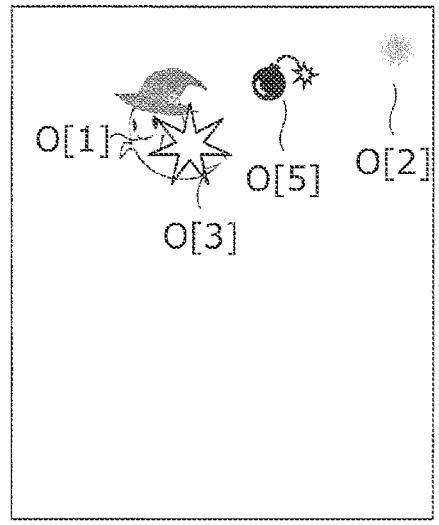
Figure 13:
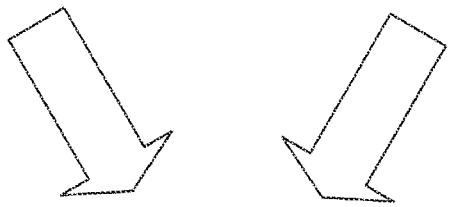
Figure 13:

FIG. 13 illustrates the blending of a texture and a video frame. FIG. 13 shows an example where the texture T[B, 1, t4] and the video frame Fv[A, t4] are blended. In this example, the texture T[B, 1, t4] shows the graphical objects O[1], O[2], O[3], and O[5]. The graphical object O[1] is a monster in a video game. The graphical object O[2] is a sun. The graphical object O[3] is a visual effect showing attacks by the streamer. The graphical object O[5] is an item (in this case, a bomb) that the viewer has sent to the streamer. The video frame Fv[A, t4] shows the streamer's selfie image. In the video frame Fv[B, d, t5], the graphical objects O1, O2 and O5 are overlayed or overlapped on the streamer's selfie image. Alternatively, the video frame Fv[B, d, t5] may be divided into plural separate areas. For example, the video frame Fv[B, d, t5] may be divided into two areas or two windows. One area is for the video frame Fv[A, t4] and the other area is for the texture T[B, 1, t4]. In such a case, these two windows are separately located and not overlapped.

Referring to FIG. 12 again, at time 6, the preview unit 131[B], which is a component of the display layer 13[B], shows the frame Fv[B, d, t5] on the display of the user terminal 10[B]. The viewer can see the streamer's selfie image on which the video game screen is overlapped. The time duration between times t1 and t6 corresponds to the frame rate of the live stream.

Further, the encoder 14[B] transmits the video frame Fv[B, u, t6], which is a component of the video stream V[B], along with the content information Ictn[B] to the streaming server 40. In this example, the video frame Fv[B, u, t6] includes the viewer's (in other words, user B's) selfie image and does not include the video game screen. Receiving the video stream V from the user terminal 10, the streaming server 40 determines the destination of the video stream V and transmits the video stream V to the destination. In this example, the streaming server 40 transmits the video stream V[B] to the user terminal 10[A]. In other words, the streaming server 40 transmits the viewer's selfie video to the streamer (operations in the streaming server 40 are not shown in the figure).

Since a single streamer can have plural viewers, showing the viewer's selfie video on the streamer's device may be suspended or omitted on the basis of the streamer's instruction. In such a case, there are at least three options. The first option is that the client applications APP of the viewers suspend transmitting the viewer's video stream to the streaming server 40. The second option is that the streaming server 40 suspends transmitting the viewer's video stream to the streamer's device while the streaming server 40 receives the viewer's video streams from the viewers' devices. The third option is that the streamer's device suspends showing the viewer's video stream to the streamer's device while the streamer's device receives the viewer's video streams from the streaming server 40. Alternatively, in a case that plural viewers transmit their selfie videos respectively, the streamer's device may select at least one viewer whose video is shown on the streamer's device.

According to the communication system 1, each user can transmit or push his/her video stream V to the streaming server 40 and receive or pull others' video stream V from the streaming server 40. Also, users can synchronize the interaction information Iirc, which includes the interaction feedback, to the interaction server 30. In other words, each user can transmit or push his/her interaction information Iirc to the interaction server 30 and receive or pull others' interaction information Iirc from the interaction server 30. In this disclosure, every interaction between users is processed at the control layer 11. Accordingly, users' operations can be mapped to correct interactive components on the control layer 11 and are reflected on the display layer 13 at both streamers' and viewers' sides, just as though they are interacting face to face.

3. Other Embodiments

The invention relating to the present disclosure is not limited to the embodiments described above. The above embodiments may be modified as described below, for example. At least two items in the following description may be combined.

3-1. Playing of a Content

Although the streamer initiates playing of a content in the above embodiments, the user who initiates playing of the content is not limited to the streamer. Since the communication system 1 is symmetrical between the streamer and the viewers, regarding the interaction information and the video stream, the communication system 1 may allow the viewers to initiate playing of a content. For example, while the streamer is providing a live video stream, at least one viewers may initiate playing of a video game. In such a case, the streamer is notified that a viewer has started a video game. For example, the client application APP[A] shows a message "User B is playing a video game. Send items to help him." Further, the client application APP[A] shows icons corresponding to options that the streamer can take. In this example, the streamer can send an item to help the viewer who is playing the video game, and has three options as potential items to be sent. These options correspond to the objects O3, O4, and O5, which are a tank, a cannon, and a bomb, for example. The following processes are similar to those in the above embodiments.

In the above embodiments, the streamer's device initiates playing of a content and the viewers' device join to play the content, in response to the viewer's instruction. However, the communication system may force the viewers' device to automatically join the content that has been initiated by the streamer, without an explicit instruction by the viewer.

3-2. Device that Plays a Content

Although a single device (the streamer's device) plays a content in the above embodiments, the number of devices that play the content is not limited to the streamer's device. For example, the communication system 1 may allow the viewers' devices to play the content. For a more detailed example, the communication system 1 may provide an option to execute or run the video game program on the viewers' devices. If the video game program is executed on a viewer's device, the viewer can directly attack the monster to help the streamer, instead of sending an item. Since the interaction information is synchronized with the streamer and the viewers, the streamer, the viewer(s), or both can attack the monster. The monster may receive double damage if the streamer and a viewer attack the monster at the same time.

3-3. Video Stream

The video streams may not be symmetrical. In other words, transmitting the video stream from the viewers' devices to the streamer's device may be omitted.

3-4. Content Information

Transmitting the content information Ictn from the user terminal 10 to the interaction server 30 may be omitted. Alternatively, transmitting the content information Ictn from the interaction server 30 to the user terminal 10 may be omitted. In other words, the interaction information Iirc transmitted from the user terminal 10 to the interaction server 30 may not include the content information Ictn. Alternatively, the interaction information Iirc transmitted from the interaction server 30 to the user terminal 10 may not include the content information Ictn. In one embodiment, when implementing an application, the communication system 1 allows an application provider to select which path the content information Ictn is transmitted, via the interaction server 30 or via the streaming server 40. For example, the application provider can implement an application in which the content information Ictn is transmitted from the user terminal 10 to the interaction server 30 and not transmitted to the stream server 40. This is preferred, for example, for a non real-time application. For another example, the application provider can implement an application in which the content information Ictn is transmitted from the user terminal 10 to the stream server 40 and not transmitted to the interaction server 30. In other words, the content information Ictn is transmitted along with the video stream. This is preferred, for example, for a real-time application since the timeline is synchronized between the content information and the live stream.

3-5. Contents and Objects

The content is not limited to a video game, and the object relating to the content is not limited to a video game character. The content may be, for example, a movie, music, a TV program, a picture, a book, a newspaper, a magazine, a comic, a web page, audio, or a combination thereof. The object may be, for example, an avatar of a user, an image, a stamp, or a UI object such as a button, an icon, a key, or a bar.

3-6. Charging Fees

The communication system 1 may charge fees depending on the interaction feedback. For example, in a case that the viewers have three options, the communication system 1 may charge fees for an option selected by the viewers. In one example, the viewers have to pay a higher fee for a stronger weapon.

3-7. Further Embodiments

The sequence for transmitting data relating to a content is not limited to the above embodiments. For example, the streaming server 40 may transmit or push a video game program to the streamer's device independently of an instruction by the streamer. Alternatively, the streaming server 40 may transmit or push a video game program in response to a viewer's instruction.

The hardware configurations described in the above embodiments are merely examples. Each entity in the communication system 1 may have any hardware configuration as long as it has required functions. For example, the servers may be physical servers, virtual servers (in other words, cloud), or a combination thereof.

Correspondence between the functional elements and the hardware elements is not limited to the example described in the above embodiments. For example, functions implemented in the streaming server 40 may be implemented in plural physical devices.

Correspondence between the functional elements and the software is not limited to the example described in the above embodiments. For example, functions implemented in the user terminal 10 may be provided by plural application programs and/or an operating system.

The programs described in the above embodiments may be provided with a computer-readable non-transitory storage device such as a solid state memory device, an optical disk storage device, or a magnetic disk storage device. Alternatively, the programs may be downloaded from a server via the Internet.

REFERENCE SIGNS LIST

1 . . . communication system, 11 . . . control layer, 12 . . . renderer, 13 . . . display layer, 14 . . . encoder, 15 ... UI unit, 16 ... decoder, 31 ... receiving unit, 32, processing unit, 33 ... storage unit, 34 ... transmitting unit, 41 ... receiving unit, 42 ... receiving unit, 43 ... processing unit, 44 ... storage unit, 45 ... transmitting unit, 101 ... CPU, 102 ... memory, 103 ... storage, 104 ... network interface, 105 ... output device, 106 ... input device, 107 ... camera, 301 ... CPU, 302 ... memory, 303 ... storage, 304 ... network interface, 401 ... CPU, 402 ... memory, 403 ... storage, 404 ... network interface

The invention claimed is:

1. A method comprising:
receiving downstream data including a first video stream and first content information, the first video stream being transmitted from a first device, the first content information describing multiple graphical objects including a real-time object and a non real-time object;
receiving first interaction information indicating a first user interaction feedback to one of the graphical objects at the first device;
generating a first content texture including the graphical objects, an appearance of the graphical objects being determined using the first content information and the first user interaction feedback being included in the first interaction information, wherein the appearance of the real-time object is determined using the first user interaction feedback;
generating a video frame including the first content texture and a second content texture, the second content texture being generated from the first video stream;
displaying the video frame at the first device and a second device;
receiving a second user interaction feedback to the video frame at the second device; and
transmitting second interaction information indicating the second user interaction feedback.

2. The method according to claim 1, further comprising transmitting upstream data including at least second content information describing the appearance of the graphical objects.

3. The method according to claim 2, wherein the upstream data further includes a second video stream generated at the second device.

4. The method according to claim 1, wherein the video frame is generated by overlaying one of the graphical objects on the first content texture.

5. The method according to claim 1, wherein the first interaction information further indicating a third user interaction feedback to one of the graphical objects at a third device.

6. The method according to claim 1, wherein the downstream data is received from a first server.

7. The method according to claim 2, wherein the upstream data is transmitted to a first server.

8. The method according to claim 1, wherein the first interaction information is received from a second server.

9. The method according to claim 8, wherein the second interaction information is transmitted to the second server.

10. The method according to claim 1, wherein the first user interaction feedback includes at least one of clicking, tapping, and dragging one of the graphical objects.

11. The method according to claim 1, wherein one of the graphical objects shows a character in a video game.

12. The method according to claim 1, wherein the first interaction information and the second interaction information include parameters, the parameters show an amount, a strength, and coordinates or location of the first user interaction feedback and the second user interaction feedback.

13. An information processing device comprising:
a control layer;
a renderer; and
a display layer, wherein
the renderer is configured to receive downstream data including a first video stream and first content information, the first video stream being transmitted from another device, the first content information describing multiple graphical objects including a real-time object and a non real-time object,
the control layer is configured to receive first interaction information indicating a first user interaction feedback to one of the graphical objects at the other device,
the renderer is configured to generate a first content texture including the graphical objects, an appearance of the graphical objects being determined using the first content information and the first user interaction feedback being included in the first interaction information,
wherein the appearance of the real-time object is determined using the first user interaction feedback;
the renderer is configured to generate a video frame including the first content texture and a second content texture, the second content texture being generated from the first video stream;
the display layer is configured to display the video frame;
the control layer is configured to receive a second user interaction feedback to the video frame; and
the control layer is configured to transmit second interaction information indicating the user interaction feedback.

14. The information processing device according to claim 13, wherein the renderer includes at least a first content processor and a second content processor, the first content processor is configured to generate the first content texture, and the second content processor is configured to generate the second content texture.

15. The information processing device according to claim 14, wherein the renderer further includes a texture processor, the texture processor being configured to blend the first content texture and the second content texture and output the blended content textures as the video frame.

16. The information processing device according to claim 13, wherein
the display layer is configured to transmit upstream data including at least second content information describing the appearance of the graphical objects.

17. The information processing device according to claim 16, further comprising a camera device that generates a second video stream, wherein the second video stream is input to the renderer, the renderer is configured to generate the second content texture in response to the second video stream, the renderer is configured to blend the first content texture and the second content texture, and the upstream data includes the blended first content texture and the second content texture.

18. The information processing device according to claim 13, wherein the renderer is configured to generate the video frame by overlaying one of the graphical objects on the first content texture.

19. The information processing device according to claim 13, wherein the first interaction information further indicates a third user interaction feedback to one of the graphical objects at a third device.

20. The information processing device according to claim 13, wherein one of the graphical objects shows a character in a video game.

\* \* \* \* \*